Figure 1:
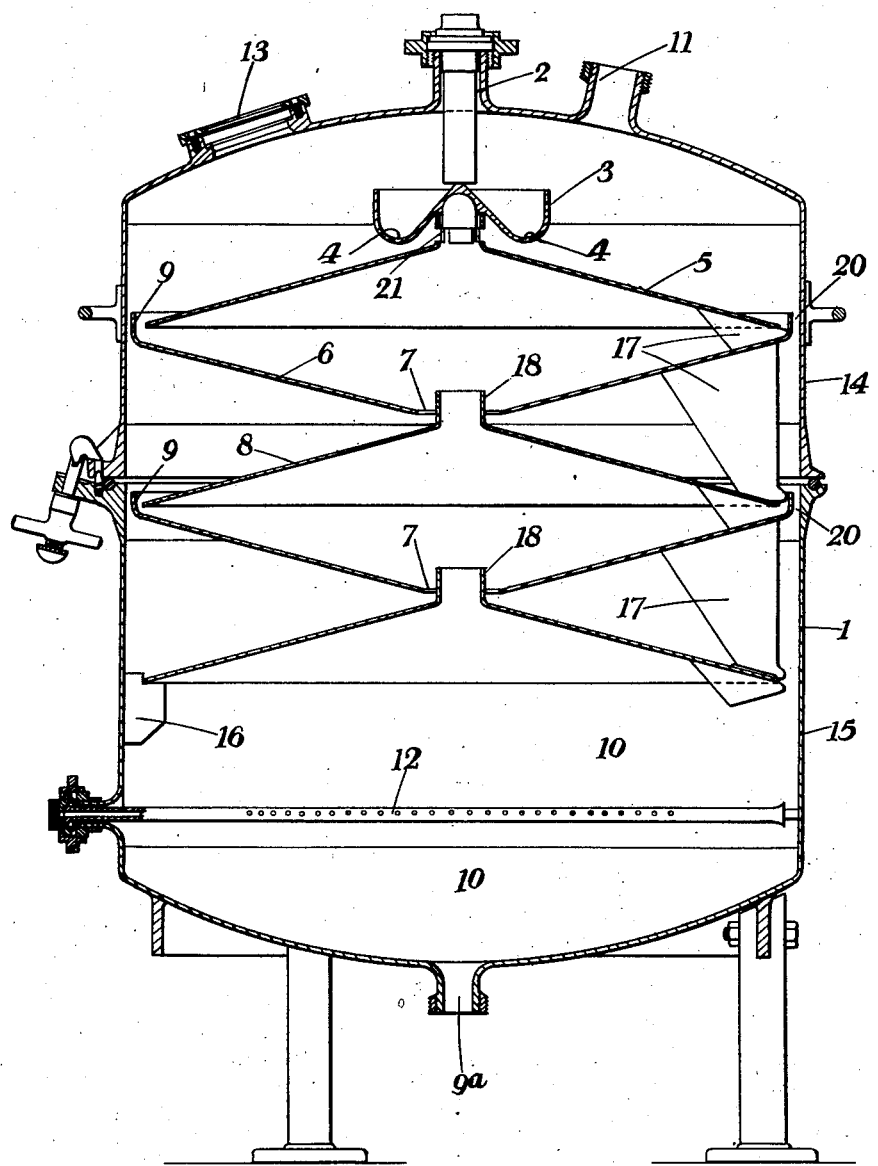

May 19, 1936. T. E. FRENCH 2,041,059
METHOD OF AND APPARATUS FOR REMOVING GASES
FROM MILK OR CREAM OR OTHER LIQUIDS
Filed Sept. 14, 1933 2 Sheets-Sheet 1

May 19, 1936. T. E. FRENCH 2,041,059
METHOD OF AND APPARATUS FOR REMOVING GASES
FROM MILK OR CREAM OR OTHER LIQUIDS
Filed Sept. 14, 1933 2 Sheets-Sheet 2

INVENTOR
Thomas Edward French
BY
Nathan, Bowman & Helferich
ATTORNEYS

Patented May 19, 1936

2,041,059

UNITED STATES PATENT OFFICE

2,041,059

METHOD OF AND APPARATUS FOR REMOVING GASES FROM MILK OR CREAM OR OTHER LIQUIDS

Thomas Edward French, Kingston, England, assignor to The Aluminium Plant & Vessel Company Limited, London, England Application September 14, 1933, Serial No. 689,452
In Great Britain September 30, 1932

3 Claims. (Cl. 99—212)

The present invention relates to an improved method of and apparatus for the treatment of milk or cream or other liquids.

During the pasteurization of milk and cream or other liquids, it is frequently desired to remove gases they contain, which may be of natural occurrence or may be produced during some stage or stages in the treatment of the liquid, as, in the case of the treatment of milk or cream, during the process of neutralizing excessive acidity with carbonates or bi-carbonates.

This can be done by passing the milk or cream into a vessel where it is subject to a partial vacuum, various devices being employed for keeping the milk or cream in circulation and for controlling the degree of vacuum, so as to cause ebullition.

Such devices are, in general, complicated and expensive, and the present invention aims to provide a novel method of treating the milk or cream or other liquid to remove the undesired gases and a simple apparatus for realizing this method.

According to one aspect of the present invention this consists in a continuous process for pasteurizing milk or cream or other liquids and disengaging gases therefrom which consists in causing the liquid to flow successively through a heating device and then as a film with a free surface over a series of moderately inclined surfaces in a closed chamber, successive surfaces having progressively increasing and progressively decreasing surface areas curved transversely to the direction of flow of the liquid thereover, the film being subjected to a partial vacuum which is insufficient to cause ebullition, and then cooling the liquid without interruption or after a period of retardation at a predetermined temperature or after re-heating.

In flowing over such surfaces, the liquid film alternately spreads and contracts and the emission of the gases is thereby facilitated. The surfaces may consist of a succession of gently sloping conical surfaces with the alternate cones inverted with respect to the others, each cone preferably having a matt or roughened surface, for example, an unpolished or sandblasted metal, e. g., aluminium surface, which has the effect of increasing the surface area and the points from which the gases evolve so as further to promote the rapid emission of the gases.

The invention also comprises improved apparatus by which the process may be carried out, such apparatus broadly consisting of a chamber containing a plurality of moderately-inclined conical or like surfaces arranged co-axially and base to base in pairs, the alternate upright cones having a central tubular portion at the apex projecting through a larger aperture in the apex of the next upper inverted cone, and an annular space being provided between the outer edges of all the conical surfaces and the interior wall of the chamber, and means to distribute the liquid on to the uppermost conical surface. A suitable slope of the cones by way of example is that shown in the drawings hereinafter referred to. For most purposes an angle between 15° to 30° to the horizontal will serve, but the angle will depend on the viscosity of the liquid and may be less than 15° or higher than 30° in certain cases, although in general the angle should not be greater than 45°. In working the apparatus, the liquid is delivered preferably by gravity on to the upper of said surfaces and flows by gravity in thin sheet form with a free upper surface over the successive surfaces and thereby takes a zig-zag or extended course to a lower discharge outlet or receiver.

The ascending gases from the liquid on the inverted cones rise through the centre of the apparatus the gases ascending from the liquid on the other cones rise through the annular spaces between the outer edges of the cones and the interior wall of the chamber.

The apparatus may be such as to provide a liquid receiving chamber below the inclined or conical surface or surfaces and the inlet and outlet capacities of the apparatus so set or adjustable as to permit the apparatus, whilst operating continuously, to effect short holding and thereby to complete pasteurization partially effected prior to the gas-removing treatment.

One constructional form of apparatus according to the invention which is well suited for the treatment of milk or cream, is depicted in the accompanying drawings, in which:—

Figure 2:
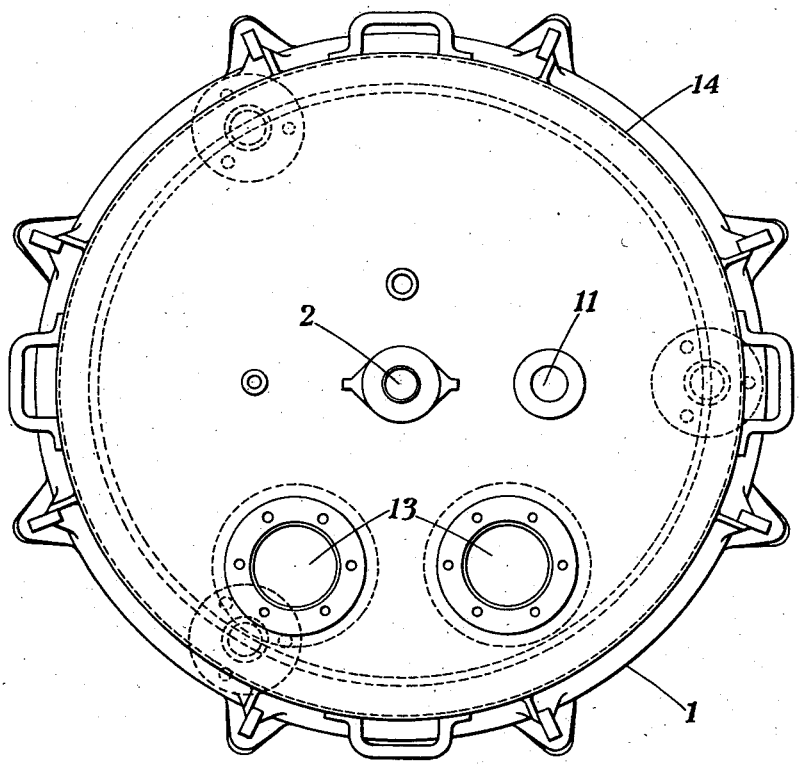

Fig. 1 is a sectional elevation;

Fig. 2 a plan view, and

Figure 3:
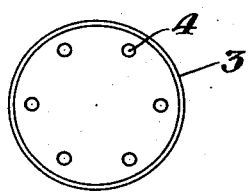

Fig. 3 is a plan view of a spreader for feeding the liquid to the cones.

This constructional form of apparatus comprises a closed container 1 provided at the top with a central inlet 2 for the milk or cream coming from a heat exchanger in which the milk or cream is partially pasteurized. Below the inlet is arranged a spreader 3, conveniently in the form of a cup or tray the bottom of which is provided with perforations 4 through which the liquid passes onto the upper part of a conical surface formed by a hollow cone 5, down which it then spreads outwardly as a film to the periphery of the cone whence it is shed onto the marginal portion of the inner surface of another hollow cone 6 which is arranged beneath and inverted with respect to the first cone and is medially apertured at 7 so that the liquid film flowing down and contracting towards the centre will fall onto a further cone 8 co-axial with the two cones above it and of similar disposition to the first cone 6. Any suitable number of cones so related to each other can be employed. The inverted cones of the series may be each provided with a rim or peripheral wall 9 extending above the periphery of the adjacent cone above it so that the liquid is prevented from avoiding its proper tortuous path. The liquid after being treated issues from the outlet 9a.

Obviously the uppermost cone could be an inverted one and the liquid marginally fed to it by an appropriately modified form of spreader.

The removal of the gases is assisted by subjecting the film of liquid to the influence of a source of vacuum, and for this purpose an orifice 11 is provided at the upper end of the container which is adapted to be coupled to means for producing a partial vacuum in the container.

The apparatus can be utilized for short holding, which is generally desirable to complete pasteurization, by leaving a sufficient depth below the lowermost cone to provide a chamber 10 for the liquid to be held in the apparatus for a certain predetermined interval, the time during which the liquid is so held to complete pasteurization being controlled by the depth of the liquid in the lower part of the container or the time taken by the liquid to pass through the apparatus, which in turn is dependent on the inlet and outlet capacities of the apparatus, and can be regulated.

Steam or a neutral or inert gas may be injected into or blown through the liquid, for instance through a perforated pipe 12 in the lower part of the container.

The capacity of the apparatus may be varied as required by varying the numbers of the cones and the dimensions thereof.

Sight-glasses 13 may be incorporated in the apparatus for inspection purposes.

The container may be sealed by a movable cover, or formed of separable sealed-together portions 14, 15, permitting access to the interior parts, and if desired the cones can be detachably supported in the container. For example the lowermost cone may be supported on lugs 16 spaced around the inner periphery of the container, the other cones having marginal webs 17 permitting them to rest on each other.

The cones that diminish towards the top are provided with a central hollow boss-like extension 18 passing through the substantially wider central apertures 7 in the other cones so that gases escaping from the liquid films on the inverted cones may have a clear central path through the apparatus to the outlet 11 at the top of the container, and peripheral space 20 is provided for gases from each of the other cone surfaces to have a clear path of escape to the said outlet and remixing of the evolved gases with the liquids is wholly or mainly avoided. The boss 18 on the uppermost cone may be ported at 21 to allow for the lateral escape of the released gases.

It is advantageous to employ aluminium cones since aluminium if not polished presents a matt surface which promotes the rapid emission of the gases from the liquid sheet. The effect may be enhanced by sand blasting or otherwise roughening the liquid-supporting surfaces.

By the use of conical surfaces inverted with respect to each other the milk or cream is successively spread and contracted.

The treated milk or cream withdrawn from the apparatus from the bottom of the container is cooled to the desired final temperature.

What I claim is:—

1. A continuous process for pasteurizing milk or cream and disengaging gases therefrom during pasteurization which consists in heating the liquid to effect partial pasteurization, then causing it to flow quietly without further heating as a film with a free surface progressively and alternately increasing and diminishing in extent toward a holding chamber where pasteurizing is completed, and simultaneously subjecting such flowing film to a partial vacuum which is insufficient to cause bubbling of the liquid, then completing the pasteurization of the liquid in the holding chamber, and then cooling the liquid without interruption.

2. A continuous process for pasteurizing milk or cream and simultaneously disengaging gases therefrom which consists in heating the liquid to effect partial pasteurization, then causing it to flow quietly without further heating as a film with a free surface alternately increasing and diminishing in area over a series of moderately inclined rough surfaces in a closed chamber toward a holding chamber, successive surfaces having progressively increasing and progressively decreasing surface area curved transversely to the direction of the flow of the film of liquid thereover, and subjecting the flowing film to a partial vacuum which is insufficient to cause ebullition, then completing pasteurization of the liquid, and then cooling the liquid without interruption.

3. A continuous process for pasteurizing milk or cream and disengaging gases therefrom during the pasteurizing process which consists in heating the liquid to effect partial pasteurization, then causing it to flow quietly without further heating as a film with a free surface alternately increasing and diminishing in area over a series of moderately inclined sandblasted surfaces in a closed chamber, successive surfaces having progressively increasing and progressively decreasing surface area curved transversely to the direction of the flow of the liquid thereover, and subjecting the flowing film of partially pasteurized liquid to a partial vacuum which is insufficient to cause ebullition, then completing the pasteurization of the liquid, and then cooling the liquid without interruption.

THOMAS EDWARD FRENCH.